(12) United States Patent
Schwittay

(10) Patent No.: US 12,024,242 B2
(45) Date of Patent: Jul. 2, 2024

(54) VALVE ASSEMBLY FOR A RESERVE PUMP OF A VEHICLE STEERING SYSTEM

(71) Applicant: Robert Bosch GmbH, Stuttgart (DE)

(72) Inventor: Olaf Schwittay, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 694 days.

(21) Appl. No.: 17/240,404

(22) Filed: Apr. 26, 2021

(65) Prior Publication Data

US 2021/0331739 A1 Oct. 28, 2021

(30) Foreign Application Priority Data

Apr. 28, 2020 (DE) ...................... 10 2020 205 341.3

(51) Int. Cl.
*B62D 5/065* (2006.01)
*B62D 5/06* (2006.01)
*B62D 5/30* (2006.01)

(52) U.S. Cl.
CPC ............. *B62D 5/065* (2013.01); *B62D 5/064* (2013.01); *B62D 5/30* (2013.01)

(58) Field of Classification Search
CPC ........... B62D 5/30; B62D 5/064; B62D 5/065
See application file for complete search history.

(56) References Cited

U.S. PATENT DOCUMENTS

| 5,826,676 A * | 10/1998 | Ko ........................... B62D 5/30 |
| | | 180/406 |
| 10,259,493 B2 * | 4/2019 | Mate ...................... B62D 5/065 |
| 11,318,988 B2 * | 5/2022 | Mate .................... B62D 15/025 |
| 2013/0291714 A1* | 11/2013 | Wu ......................... F15B 21/08 |
| | | 91/471 |

FOREIGN PATENT DOCUMENTS

| DE | 10 2014 010 174 A1 | 1/2015 | |
| EP | 3748168 A1 * | 12/2020 | ............ E02F 9/2235 |

OTHER PUBLICATIONS

"Lenkeinheiten mit Load-Sensing OSPB/C/F/D/L LS, OLS Prioritätsventile, OSQ Volumenstromverstärker," Technische Informationen, Danfoss, Sep. 2014 (88 pages).

\* cited by examiner

*Primary Examiner* — Tony H Winner
*Assistant Examiner* — Hosam Shabara
(74) *Attorney, Agent, or Firm* — Maginot, Moore & Beck LLP

(57) ABSTRACT

A valve assembly for use with a main pump, a reserve pump, a steering valve with a second load signaling connector, and a first pressure switch includes an adjustable first orifice and a flow control valve. The valve assembly further includes a fluid flow path running from a first high pressure connector via the first orifice, further via a control point, further via the flow control valve, to a first low pressure connector. The first orifice is loaded in the opening direction by the pressure at the first high pressure connector, and the first orifice is loaded in the closing direction by a spring and by the pressure at the first load signaling connector. The control point is connected permanently to the first measuring connector.

10 Claims, 1 Drawing Sheet

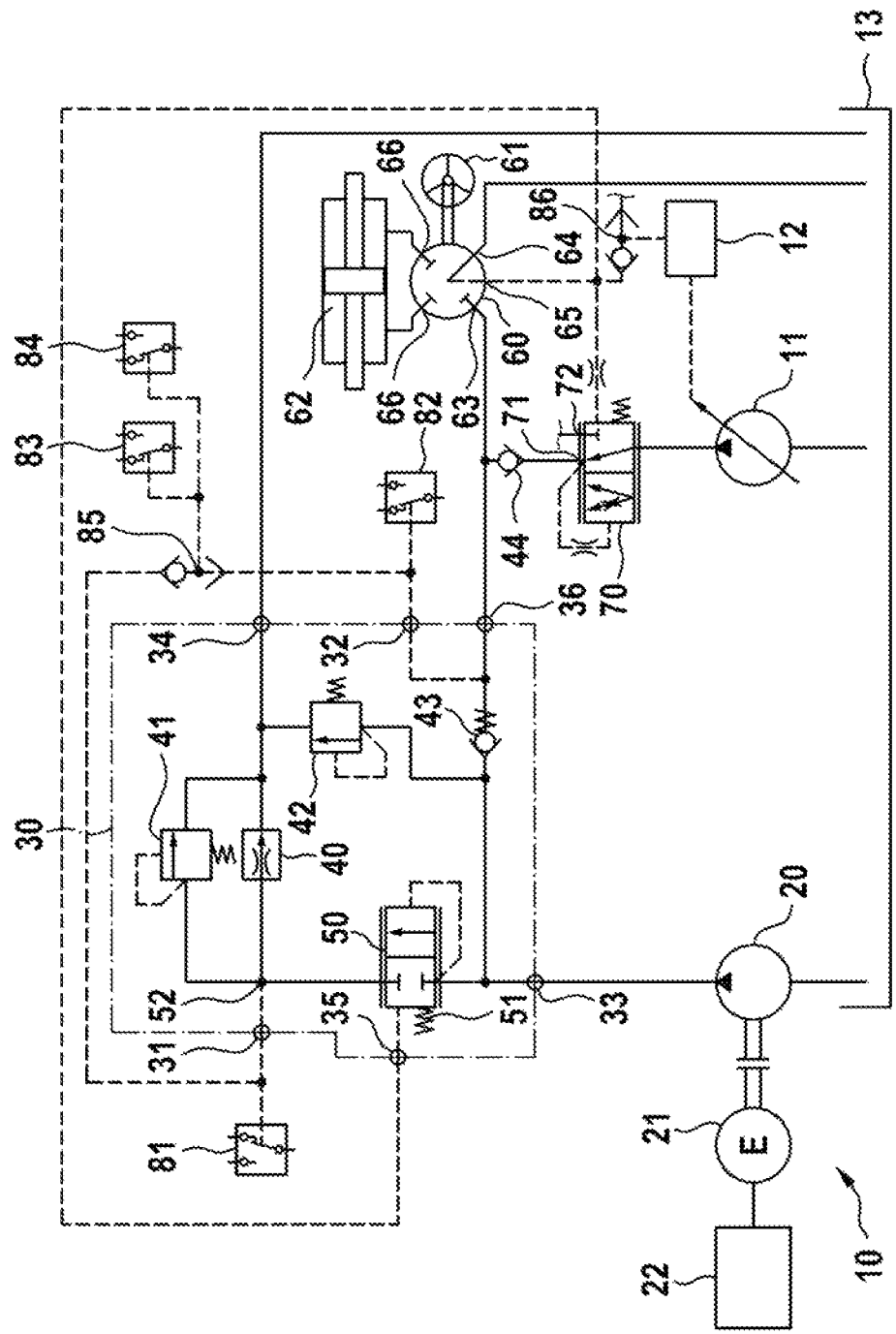

VALVE ASSEMBLY FOR A RESERVE PUMP OF A VEHICLE STEERING SYSTEM

This application claims priority under 35 U.S.C. § 119 to application no. DE 10 2020 205 341.3, filed on Apr. 28, 2020 in Germany, the disclosure of which is incorporated herein by reference in its entirety.

The disclosure relates to a valve assembly for use with a main pump, a reserve pump, a steering valve with a second load signaling connector and a first pressure switch, the valve assembly having a first high pressure connector, a first low pressure connector, a first load signaling connector and a first measuring connector, it being possible for the reserve pump to be connected to the first high pressure connector, it being possible for the second load signaling connector to be connected to the first load signaling connector, it being possible for the first pressure switch to be connected to the first measuring connector, it being possible for the first low pressure connector to be connected to a tank. Furthermore, the disclosure relates to a method for starting up a vehicle with a valve assembly of this type, and to a method for operating a vehicle with a valve assembly of this type.

BACKGROUND

DE 10 2014 010 174 A1 has disclosed a hydraulic vehicle steering system which comprises an electrically operated reserve pump. The reserve pump is used if the main pump fails, in order to ensure the steering capability of the vehicle.

In the case of each start up of the vehicle, the reserve pump is usually thereupon checked for reasons of safety as to whether it has the required performance. If this is not the case, the corresponding vehicle cannot be set in motion.

A steering valve with a load signaling connector is known from the catalog which could be retrieved on 04.17.2020 at the Internet address https://assets.danfoss.com/documents/DOC193686484007/DOC193686484007.pdf. Furthermore, a priority valve is shown in said catalog.

SUMMARY

One advantage of the present disclosure consists in that the check of the reserve pump can be carried out reliably by way of a valve assembly of simple and inexpensive construction. During start up, the electric motor of the reserve pump is loaded only with a small torque, with the result that the charging state of the battery is conserved. Furthermore, the valve apparatus according to the disclosure contributes to the pressure control of the steering hydraulic system in the case of the actual emergency operation of the steering system. No further valves are required for this purpose.

It is proposed according to the disclosure that the valve assembly comprises an adjustable first orifice and a flow control valve, a fluid flow path running from the first high pressure connector via the first orifice, further via a control point, further via the flow control valve to the first low pressure connector, the first orifice being loaded in the opening direction by the pressure at the first high pressure connector, the first orifice being loaded in the closing direction by a spring and by the pressure at the first load signaling connector, the control point being connected permanently to the first measuring connector. The reserve pump is preferably driven by an electric motor which can be supplied with current by means of a rechargeable battery. The first orifice is preferably formed by a 2/2-way valve. It is also conceivable, however, that the first orifice is a constituent part of a priority valve, the non-prioritized output of which is connected permanently to the control point, the prioritized output being connected to the second pressure connector. The first check valve, which is addressed to below, is then switched between the prioritized output and the second pressure connector. The first orifice is preferably steplessly adjustable.

It can be provided that a first pressure limiting valve is connected in parallel to the flow control valve between the control point and the first low pressure connector. In this way, the required operating pressure can be checked simply, overloading of the reserve pump during the check being avoided at the same time. The opening pressure of the first pressure limiting valve is preferably set in accordance with the operating pressure to be checked at the operating point of the reserve pump. Said opening pressure is, for example, 50 bar. Said operating pressure is not achieved until the reserve pump delivers somewhat more than is set at the flow control valve. Accordingly, the flow control valve is preferably set to be somewhat lower than the operating delivery flow to be checked. The first pressure limiting valve is preferably installed in such a way that it limits the pressure at the control point to the set opening pressure.

It can be provided that a pressure equivalent of said spring is between 4% and 20% of an opening pressure of the first pressure limiting valve. As a result, firstly reliable opening of the first orifice within the context of the check of the reserve pump is achieved. Secondly, a low delivery pressure of the reserve pump results in the case of the actual emergency operation of the reserve pump, as long as the steering system is not actuated. Said pressure equivalent of the spring is, for example, 4 bar.

It can be provided that the valve assembly has a second high pressure connector, to which the steering valve can be connected at least indirectly, the second high pressure connector being connected via a first check valve to the first high pressure connector, the first check valve permitting exclusively a fluid flow from the first high pressure connector toward the second high pressure connector. In this way, the steering valve can be supplied with pressure fluid by way of the reserve pump in emergency operation. The second high pressure connector is preferably connected, very highly preferably is connected permanently, to a third high pressure connector of the steering valve. The check valve is preferably prestressed into the closed position by way of a spring. The second high pressure connector is preferably connected permanently to a second measuring connector, with the result that the pressure there can be monitored by means of pressure switches or pressure sensors.

It can be provided that the first high pressure connector is connected via a second pressure limiting valve to the first low pressure connector. By way of the second pressure limiting valve, overloading of the reserve pump and the valve assembly is avoided reliably. The second pressure limiting valve is preferably installed in such a way that it limits the pressure at the first high pressure connector to the set opening pressure.

It can be provided that an opening pressure of the second pressure limiting valve is from 1.5 to 3 times an opening pressure of the first pressure limiting valve. Said opening pressure of the second pressure limiting valve is, for example, 100 bar.

It can be provided that the first orifice and the flow control valve and possibly the first pressure limiting valve and possibly the second pressure limiting valve and possibly the check valve are received in a common single-piece housing, the first high pressure connector, the first low pressure connector, the first load signaling connector and the first measuring connector and possibly the second high pressure connector being arranged directly on said housing. This results in a particularly compact and light valve assembly. The risk of leaks is low. The valve assembly is preferably configured as a monolithic valve block.

It can be provided that the flow control valve is configured as a 2-way flow control valve. In the case of a 2-way flow control valve, a pressure compensator is connected in series with a measuring orifice, the pressure compensator adjusting the pressure drop at the measuring orifice to a predefined value. Within the context of this control operation, no pressure fluid is conducted to the tank, as is the case in a 3-way flow control valve. It is utilized within the context of the disclosure, inter alia, that the pressure rises very steeply upstream of the flow control valve if the reserve pump delivers more than is set as a setpoint value at the flow control valve. The operating point to be checked of the reserve pump, that is to say the combination of an operating pressure and an operating delivery flow, can therefore be achieved without problems.

The disclosure further includes a method for starting up a vehicle which comprises a valve assembly according to the disclosure, a reserve pump being connected to the first high pressure connector, a tank being connected to the first low pressure connector, a first pressure switch being connected to the first measuring connector, the reserve pump being set in a rotational movement, the vehicle subsequently either being further started up or being shut down in a manner which is dependent on a switching state of the first pressure switch. In the case of the further starting up of the vehicle, the reserve pump is preferably brought to a standstill again, with the result that the battery is not discharged further. Said switching state of the first pressure switch is preferably evaluated after a predefined time duration after the switching on of the reserve pump. The electric motor which is connected to the reserve pump is preferably actuated in such a way that the operating point to be monitored results solely from the setting of the flow control valve and possibly the first pressure limiting valve. In the case of a direct current motor, it is connected simply to the voltage supply. If the latter is sufficiently high, the starting up can be continued; if not, the vehicle is shut down.

Furthermore, a method is described for operating a vehicle which comprises a valve assembly according to the disclosure, a reserve pump being connected to the first high pressure connector, a tank being connected to the first low pressure connector, a steering valve being connected to the second high pressure connector, which steering valve is supplied with pressure fluid by a main pump during normal operation, the reserve pump being operated, after a failure of the main pump, with a fluid flow which lies below the conveying flow which is set at the flow control valve. In this way, the flow control valve does not substantially disrupt the emergency operation of the reserve pump. The fluid flow which is checked by way of the valve assembly is preferably selected to be somewhat higher than the delivery flow which is actually required for the emergency operation, in order that the above mode of operation of the vehicle is possible.

It goes without saying that the features which are mentioned in the above text and are still to be explained in the following text can be used not only in the respective specified combination, but rather also in other combinations or on their own, without departing from the scope of the present disclosure.

BRIEF DESCRIPTION OF THE DRAWINGS

In the following text, the disclosure will be described in greater detail on the basis of the appended drawing, in which:

The FIGURE shows a circuit diagram of a steering apparatus with a valve assembly according to the disclosure.

DETAILED DESCRIPTION

The sole FIGURE shows a circuit diagram of a steering apparatus 10 with a valve assembly 30 according to the disclosure. The steering apparatus 10 comprises a steering valve 60 which is actuated by means of a steering wheel 61. The steering valve 60 has two working connectors 66 which are connected to a steering cylinder 62 of a vehicle steering system. Furthermore, the steering valve 60 has a third high pressure connector 63 and a second low pressure connector 64. In a manner which is dependent on the position of the steering wheel 61, the two last-mentioned connectors 63; 64 are connected to the working connectors 66. The higher of the two pressures at the working connectors 66 is conducted out at the second load signaling connector 65. The pressure at the third high pressure connector 63 should not undershoot the pressure at the second load signaling connector 65, in order that the steering system operates properly.

During normal operation, the steering valve 60 is supplied with pressure fluid by a main pump 11. The pressure fluid is preferably a liquid and very highly preferably hydraulic oil. The main pump 11 can be, for example, an axial piston pump of swash plate design. In the present case, its displacement volume is steplessly adjustable. The main pump 11 typically supplies further hydraulic consumers (not shown) which are connected to the subordinate output 72 of the priority valve 70. Their highest load pressure can prevail at an input of a second shuttle valve 86, the pressure at the second load signaling connector 65 prevailing at its other input. Accordingly, the highest load pressure of all the hydraulic consumers including the steering system prevails at the output of the second shuttle valve 86.

In the present case, the main pump 11 is assigned a pump controller 12, the manipulated variable of which is the setting of the displacement volume of the main pump 11. If the main pump 11 has a constant displacement volume, the pump controller 12 can conduct a variable part of the fluid flow which is conveyed by the main pump into the tank 13, in order to achieve the same effect. Said pump controller is then preferably connected downstream of the subordinate output 72 of the priority valve 70, it being possible for said pump controller to be formed by the priority valve 70 itself if there are no further hydraulic consumers in addition to the steering system. The pump controller 12 can be configured as a pressure controller which adjusts the conveying pressure of the main pump 11 to a pressure which lies by a predefined pressure difference above the highest load pressure, that is to say the output pressure of the second shuttle valve 86.

If there are no further hydraulic consumers in addition to the steering system, the priority valve 70 and the second shuttle valve 86 can be dispensed with. The known priority valve 70 achieves a situation where the steering system which is connected to the prioritized output 71 is supplied reliably with pressure fluid even when the delivery capacity of the main pump 11 is not sufficient to supply all the hydraulic consumers in accordance with the instantaneous requirement.

The prioritized output 71 is connected via a second check valve 44 to the third high pressure connector 63, the second check valve 44 allowing exclusively a fluid flow from the main pump 11 to the steering valve 60. The second check valve 44 brings about load holding which prevents the steering cylinder 62 from moving counter to the desired movement direction if the delivery pressure of the main pump 11 is not sufficient to support the external forces which act on the steering cylinder 62. The second low pressure connector 64 of the steering valve 60 is connected permanently to the tank 13.

Furthermore, the steering apparatus 10 comprises a separate reserve pump 20 which is provided for the case where the main pump 11 fails. Here, the reserve pump 20 is designed in such a way that the steering system can be supplied reliably with pressure fluid, the further hydraulic consumers which are possibly present not being supplied. The reserve pump 20 preferably has a constant displacement volume, said reserve pump being, for example, an external gear pump. In the case of the present steering apparatus 10, the reserve pump 20 is driven by an electric motor 21 which is in turn supplied with current by a rechargeable battery 22. The corresponding controller of the current supply of the electric motor 21 is not shown in the FIGURE.

It is required for safety reasons in the case of steering apparatuses 10 of this type that, within the context of each start up of the corresponding vehicle, a check is made as to whether the reserve pump 20 has the required performance, that is to say whether it can achieve a predefined delivery pressure in the case of a predefined delivery flow. If this is not the case, for example because the battery 22 is not charged sufficiently, the start up of the vehicle is prevented, with the result that the latter cannot be set in motion.

The present disclosure achieves a situation where this check can be carried out in a simple way, the electric motor not being loaded with excessively high torques which have the consequence of a high current drain from the battery. The battery is therefore discharged only to a small extent within the context of the check. Moreover, the valve assembly according to the disclosure contributes to the pressure control during emergency operation.

The valve assembly 30 is preferably configured as a monolithic valve block, the corresponding assembly being surrounded by a dash-dotted line in the drawing. In the present case, the corresponding single-piece housing has a first and a second high pressure connector 33; 36, a first low pressure connector 34 and a first and a second measuring connector 31; 32. The reserve pump 20 sucks pressure fluid in from the tank 13 and conveys it to the first high pressure connector 33. The second high pressure connector 36 is connected downstream of the second check valve 44, with the result that the third high pressure connector 63 of the steering valve 60 can be supplied with pressure fluid from there. The first low pressure connector 34 is connected permanently to the tank 13. In the present case, the first measuring connector 31 is connected to a first pressure switch 81 which switches over an electric switch in the case of a predefined pressure value being exceeded. It goes without saying that a pressure sensor can also be used instead of a pressure switch, a pressure switch being preferred for safety reasons. The second measuring connector 32 will be described in greater detail further below.

A fluid flow path runs from the first high pressure connector 33 via an adjustable first orifice 50, further via a control point 52, further via a flow control valve 40 to the first low pressure connector 34. Here, a first pressure limiting valve 41 is connected in parallel with the flow control valve 40 between the control point 52 and the first low pressure connector 34. The first pressure limiting valve 41 is installed in such a way that it limits the pressure at the control point 52 to the set opening pressure which is, for example, 50 bar. Said opening pressure corresponds to the operating pressure which is required by the reserve pump within the context of the check. As long as said pressure is not reached, the pressure fluid which is conveyed by the reserve pump 20 flows solely via the flow controller 40 to the tank 13. The flow controller 40 is set, for example, to 14 l/min, the volumetric flow which is conveyed by the reserve pump 20 being 15 l/min. The flow control valve 40 is configured in a 2-way design, that is to say a pressure compensator is connected in series with a measuring orifice, a pressure difference at the measuring orifice being adjusted to a predefined value by means of the pressure compensator. Therefore, the volumetric flow through the measuring orifice is dependent solely on its opening cross section which is selected in accordance with the desired volumetric flow. As soon as the reserve pump 20 delivers somewhat more than what is set at the flow regulator 40, the pressure at the control point 52 rises steeply until the opening pressure of the first pressure limiting valve 41 is reached.

If the electric motor 21 of the reserve pump 20 is therefore energized by means of the battery 22 for the purpose of checking, first of all the rotational speed rises in the case of a low torque until the desired fluid flow is almost reached. The torque then rises, the rotational speed increasing further only to a minimum extent. An operating state, which is unfavorable for the battery, with a low rotational speed in the case of a high torque at the same time does not take place.

Reaching of the provided operating pressure is monitored by way of a first pressure switch 81, the switching point of which is selected accordingly. Additional monitoring or measuring of the fluid flow is not required, since said fluid flow is ensured reliably by way of the flow control valve 40 if there is the desired operating pressure.

Reference is also to be made to the second pressure limiting valve 42 which is connected between the first high pressure connector 33 and the first low pressure connector 34. Said second pressure limiting valve sets the upper limit of the pressure at the first high pressure connector 33, with the result that pressure overloading of the valve assembly 30 is prevented reliably.

The first orifice 50 is loaded by the pressure at the first high pressure connector 33 in the opening direction. In the closing direction, it is loaded by the pressure at the first load signaling connector 35 and by the prestressing force of a spring 51. The pressure equivalent of the spring 51 is, for example, 4 bar.

Within the context of the check, the pressure in the tank 13 prevails substantially at the first and at the second load signaling connector 35; 65 because the steering wheel 61 is not being moved. Therefore, within the context of the check, the first orifice 50 is opened completely because the reserve pump can readily reach the pressure equivalent of the spring 51 and therefore the opening pressure of the first orifice 50.

If the main pump 11 then fails during real driving operation, the reserve pump 20 is set in rotational motion, said reserve pump running, for example, at a constant rotational speed. Here, the rotational speed is preferably selected in such a way that the pressure drop at the flow control valve 40 is so low that it does not disrupt the control at the orifice 50 when the steering system is actuated. The pressure drop at the flow control valve 40 is very highly preferably so low that the reserve pump 20 runs at a low delivery pressure as long as the steering system is not actuated. The conveying pressure of the reserve pump 20 results from the pressure equivalent of the spring 51 as long as the pressure drop at the flow control valve 40 is not too great.

If the steering wheel 61 is then actuated, the pressure at the first high pressure connector 33 rises because the pressure at the first and at the second load signaling connector 35; 65 rises. The first orifice 50 operates now as a pressure compensator which adjusts the pressure at the first high pressure connector 33 to a value which lies above the pressure at the first load signaling connector 35 by the pressure equivalent of the spring 51. The first orifice 50 is accordingly of steplessly adjustable configuration, in order that it can carry out this function. For the pure checking operation, it would be sufficient if the first orifice 50 were a constituent part of a pure switching valve.

As soon as the pressure at the first high pressure connector 33 exceeds the pressure at the second high pressure connector 36 which is generated by the failed main pump 11, the first check valve 43 opens. As a consequence, the steering valve 60 is supplied with pressure fluid by the reserve pump 20. The corresponding pressure is high enough on account of the pressure control by way of the first orifice 50, in order to move the steering system. Excessive pressure fluid which is conveyed by the reserve pump 20 is conducted via the first orifice 50 and the flow control valve 40 into the tank 13. Here, only a small pressure drop takes place at the flow control valve 40.

Reference is to be made at this point to the second measuring connector 32, which is connected permanently to the second high pressure connector 36. It would be conceivable fundamentally for the reserve pump 20 to be allowed to run permanently during the operation of the vehicle. It would then automatically assume the supply of the steering system in the case of a failure of the main pump 11, without an additional control intervention being necessary for this purpose. This would load the battery 22 greatly, however, with the result that only a small amount of energy would be stored there during emergency operation.

In order to remedy this, the second, the third and the fourth pressure switch 82; 83; 84 are provided in the steering apparatus 10 according to the drawing. The correct operation of the main pump 11 can be monitored by way of said pressure switches, the reserve pump being activated only when a malfunction of the main pump 11 is detected via said monitoring or other, further monitoring operations.

The pressure which prevails at the third high pressure connector 63 of the steering valve 60 is monitored directly by way of the second pressure switch 82. Said pressure corresponds at least to the pressure equivalent of the control spring in the priority valve 70.

The output pressure of the shuttle valve can be monitored by way of the third and the fourth pressure switch 83; 84. Here, the fourth pressure switch 84 forms a redundancy for the third pressure switch 83. On the input side, the first and the second measuring connector 31; 32 are connected to the first shuttle valve 85, with the result that the higher of the two corresponding pressures is decisive for the monitoring. As a result, the first and second pressure switch 81; 82 can therefore be dispensed with, there being only the third pressure switch 83 and, if desired, the fourth pressure switch 84.

In the case of this simplified pressure monitoring, the check of the reserve pump 20 preferably takes place as long as the main pump 11 is not running. Contrary to the illustration in the FIGURE, the shuttle valve 86 is preferably received in the common housing of the valve assembly 30.

The first and/or the second and/or the third and/or the fourth pressure switch 81; 82; 83; 84 can operate in an absolute manner or can be configured as a differential pressure switch.

LIST OF REFERENCE SIGNS

10 Steering apparatus
11 Main pump
12 Pump controller
13 Tank
20 Reserve pump
21 Electric motor
22 Battery
30 Valve assembly
31 First measuring connector
32 Second measuring connector
33 First high pressure connector
34 First low pressure connector
35 First load signaling connector
36 Second high pressure connector
40 Flow control valve
41 First pressure limiting valve
42 Second pressure limiting valve
43 First check valve
44 Second check valve
50 First orifice
51 Spring
52 Control point
60 Steering valve
61 Steering wheel
62 Steering cylinder
63 Third high pressure connector
64 Second low pressure connector
65 Second load signaling connector
66 Working connector
70 Priority valve
71 Prioritized output
72 Subordinate output
81 First pressure switch
82 Second pressure switch
83 Third pressure switch
84 Fourth pressure switch
85 First shuttle valve
86 Second shuttle valve

The invention claimed is:

1. A valve assembly for use with a main pump, a reserve pump, a steering valve with a second load signaling connector and a first pressure switch, the valve assembly comprising:
    a first high pressure connector configured to be connected to the reserve pump;
    a first low pressure connector configured to connect to a tank;
    a first load signaling connector configured to connect to the second load signaling connector;
    a first measuring connector configured to connect to the first pressure switch;
    an adjustable first orifice;
    a flow control valve; and
    a fluid flow path running from the first high pressure connector via the first orifice, further via a control point, further via the flow control valve, to the first low pressure connector,
    wherein the first orifice is loaded in an opening direction by a pressure at the first high pressure connector and the first orifice is loaded in a closing direction by a spring and by a pressure at the first load signaling connector, and
    wherein the control point is connected permanently to the first measuring connector.

2. The valve assembly according to claim 1, further comprising:
    a first pressure limiting valve connected in parallel to the flow control valve between the control point and the first low pressure connector.

3. The valve assembly according to claim 2, wherein a pressure equivalent of said spring is between 4% and 20% of an opening pressure of the first pressure limiting valve.

4. The valve assembly according to claim 1, further comprising:
 a second high pressure connector configured to be connected, at least indirectly, to the steering valve; and
 a first check valve via which the second high pressure connector is connected to the first high pressure connector, the first check valve permitting a fluid flow exclusively from the first high pressure connector toward the second high pressure connector.

5. The valve assembly according to claim 1, further comprising:
 a second pressure limiting valve via which the first high pressure connector is connected to the first low pressure connector.

6. The valve assembly according to claim 5, further comprising:
 a first pressure limiting valve connected in parallel to the flow control valve between the control point and the first low pressure connector,
 wherein a pressure equivalent of said spring is between 4% and 20% of a first opening pressure of the first pressure limiting valve, and
 wherein a second opening pressure of the second pressure limiting valve is from 1.5 to 3 times the first opening pressure of the first pressure limiting valve.

7. The valve assembly according to claim 1, wherein the first orifice and the flow control valve are received in a common single-piece housing, and the first high pressure connector, the second low pressure connector, the first load signaling connector and the first measuring connector are arranged directly on said housing.

8. The valve assembly according to claim 1, wherein the flow control valve is configured as a 2-way flow control valve.

9. A method for starting up a vehicle that includes a valve assembly, the method comprising:
 connecting a reserve pump to a first high pressure connector of the valve assembly;
 connecting a tank to a first low pressure connector of the valve assembly;
 connecting a first pressure switch to a first measuring connector of the valve assembly;
 setting a reserve pump in a rotational movement, the reserve pump configured to be connected to a first high pressure connector of the valve assembly; and
 further starting up the vehicle or shutting down the vehicle based on a switching state of the first pressure switch,
 wherein a fluid flow path runs from the first high pressure connector via an adjustable first orifice, further via a control point, further via the flow control valve, to the first low pressure connector,
 wherein the first orifice is loaded in an opening direction by a pressure at the first high pressure connector and the first orifice is loaded in a closing direction by a spring and by a pressure at the first load signaling connector, and
 wherein the control point is connected permanently to the first measuring connector.

10. A method for operating a vehicle that includes a valve assembly, the method comprising:
 connecting a reserve pump to a first high pressure connector of the valve assembly;
 connecting a tank to a first low pressure connector of the valve assembly;
 connecting a steering valve to a second high pressure connector of the valve assembly, the steering valve being supplied with pressure fluid by a main pump during normal operation, the steering valve including a second load signaling connector that is configured to connect to a first load signaling connector of the valve assembly;
 operating the reserve pump after a failure of the main pump, with a fluid flow that is less than a conveying flow set at the flow control valve,
 wherein the valve assembly includes a first measuring connector configured to connect to a first pressure switch, an adjustable first orifice, a flow control valve, and a fluid flow path running from the first high pressure connector via the first orifice, further via a control point, further via the flow control valve, to the first low pressure connector,
 wherein the first orifice is loaded in an opening direction by a pressure at the first high pressure connector and the first orifice is loaded in a closing direction by a spring and by a pressure at the first load signaling connector, and
 wherein the control point is connected permanently to the first measuring connector.

* * * * *